Aug. 11, 1953 W. H. EDMUNDS 2,648,742
ARC CHUTE PLATE
Filed Sept. 14, 1949 4 Sheets-Sheet 1

INVENTOR.
W. Harold Edmunds
BY
Ostrolenk & Faber
Attorneys

Aug. 11, 1953 W. H. EDMUNDS 2,648,742
ARC CHUTE PLATE
Filed Sept. 14, 1949 4 Sheets-Sheet 2

INVENTOR.
W. Harold Edmunds
BY
Ostrolenk & Faber
ATTORNEYS.

Aug. 11, 1953          W. H. EDMUNDS          2,648,742
                        ARC CHUTE PLATE
Filed Sept. 14, 1949                        4 Sheets-Sheet 3

INVENTOR.
W. Harold Edmunds
BY
Ostrolenk & Faber
ATTORNEYS.

Aug. 11, 1953 W. H. EDMUNDS 2,648,742
ARC CHUTE PLATE
Filed Sept. 14, 1949 4 Sheets-Sheet 4
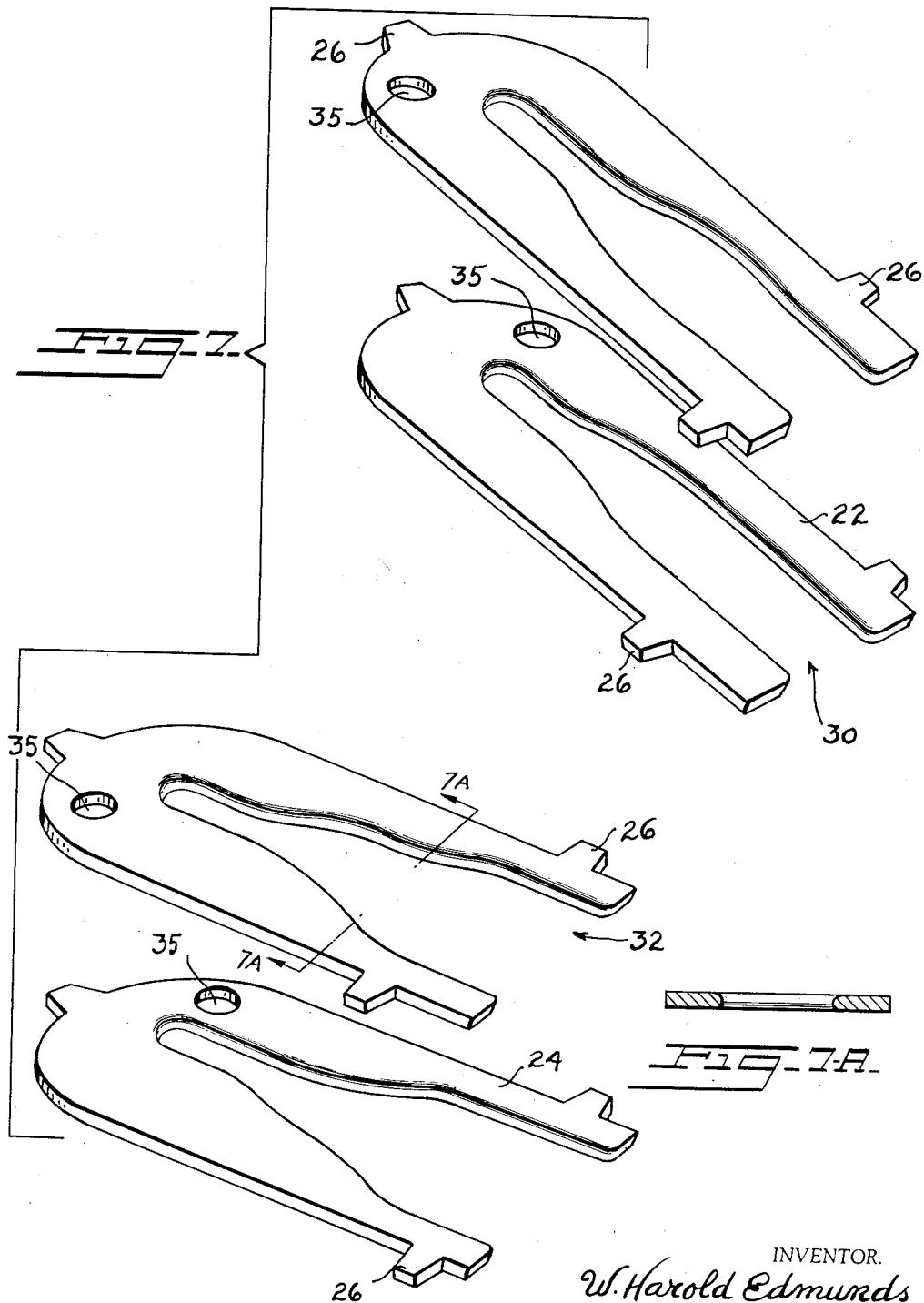
INVENTOR.
W. Harold Edmunds
BY
Ostrolenk + Faber
ATTORNEYS.

Patented Aug. 11, 1953

2,648,742

UNITED STATES PATENT OFFICE 2,648,742

ARC CHUTE PLATE

William Harold Edmunds, Havertown, Pa., assignor to I-T-E Circuit Breaker Company, Philadelphia, Pa., a corporation of Pennsylvania Application September 14, 1949, Serial No. 115,745

6 Claims. (Cl. 200—144)

My present invention relates to circuit breakers and more particularly to an arc extinguishing device for extinguishing the arc formed on the separation of the contacts of a circuit breaker.

More specifically, my invention relates to a space plate arc extinguisher of the type wherein a plurality of substantially parallel plates are arranged in a plane normal to the path of the arc and wherein the plates are provided with slots or notches which are aligned to provide an arc passage.

Still more specifically my invention relates to a spaced plate arc extinguisher having notched metallic plates arranged in planes transverse to the arc path wherein the notches in the plates adjacent the point where the arc is first initiated are wider than the notches in the plates more remote from the point of initiation of the arc.

Heretofore it has been found that in a space plate arc extinguisher wherein the notches were of substantially the same size that the notches in the plates adjacent the point where the arc was first drawn, that is the notches adjacent the stationary contact, tended to become pitted and eroded at the edges to a substantial extent, while the notches in the plates more remote from the point of initiation of the arc tended to be unmarked and uneroded.

This excess pitting and erosion tended to reduce the life of the arc extinguisher, while the slow wearing away and volatilization of the material of the plates injected conductive material into the arc path which necessarily interfered with proper arc extinguishment.

My invention has for its primary object the arrangement of notched spaced plate arc chute wherein the plates are arranged substantially transverse to the arc path and the notches arranged to define the arc path in such manner that the notches adjacent the point of initiation of the arc are wider than the notches more remote from the point of initiation of the arc.

The foregoing and many other objects of my invention will become apparent in the following description and drawings in which:

Figure 7 is an exploded view showing some of the plates of my novel arc chute.

Figure 7a is a cross-section on line 7a—7a of Figure 7.

Figure 1:
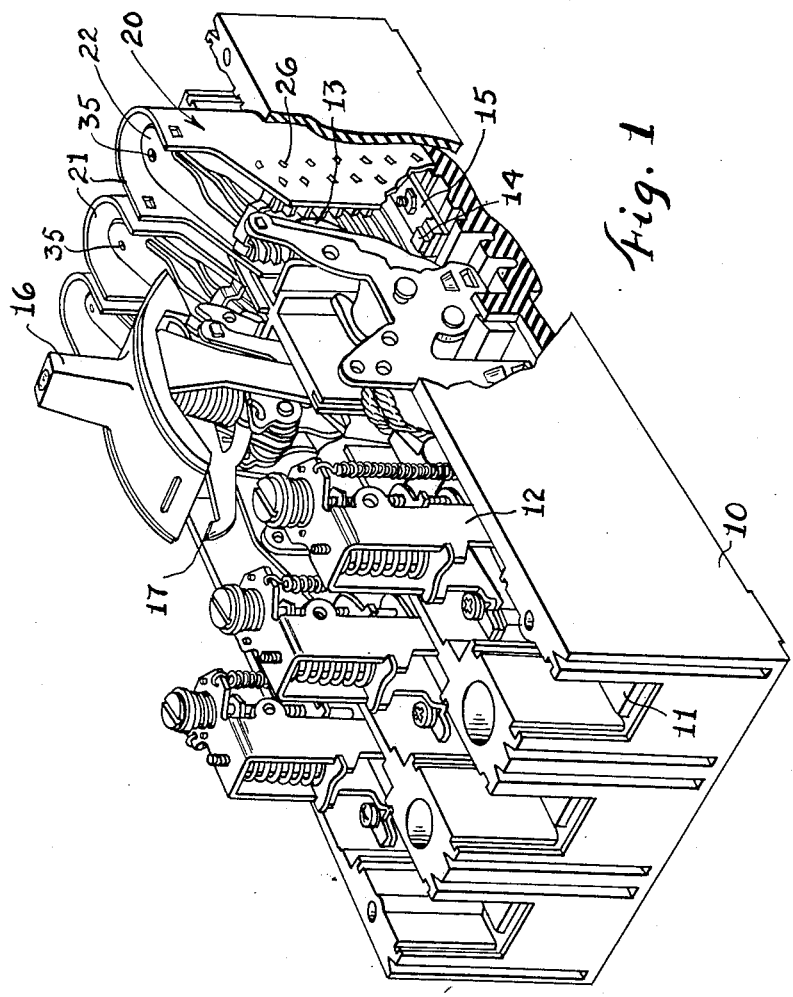
Figure 1 is a view in perspective partly broken away showing a circuit breaker utilizing my novel arc chute.
Figure 2:
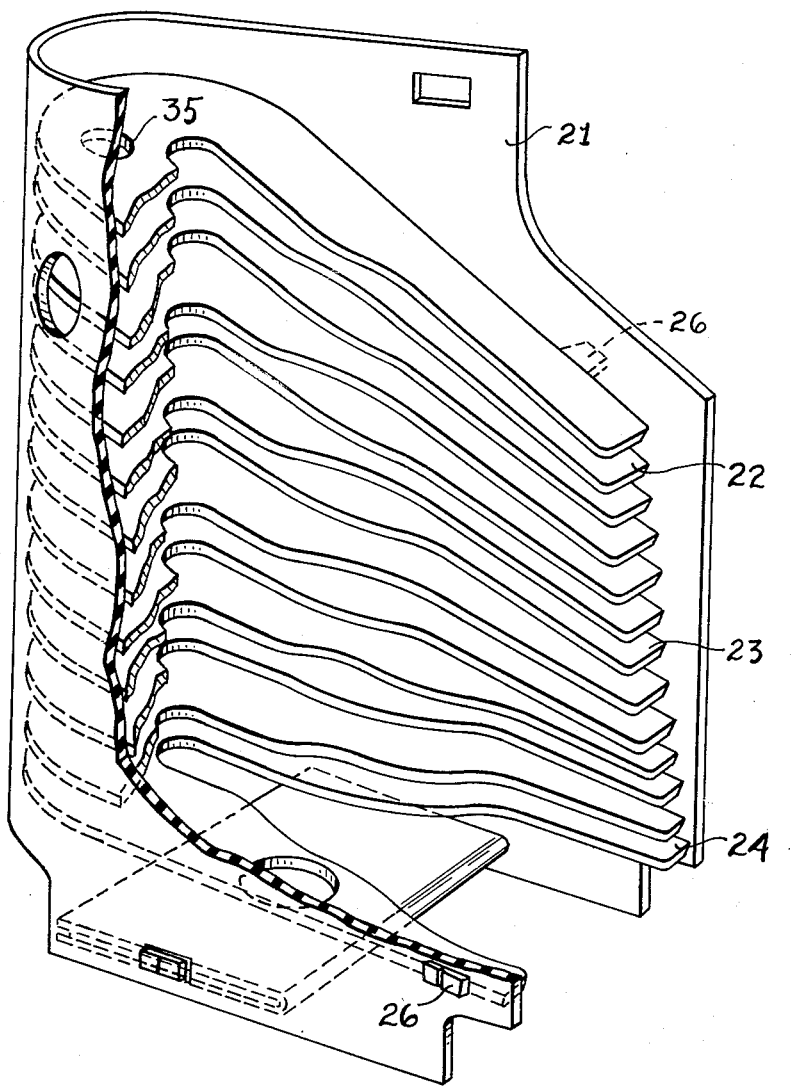
Figure 2 is an enlarged view in perspective partly broken away showing my novel arc chute.
Figure 3:
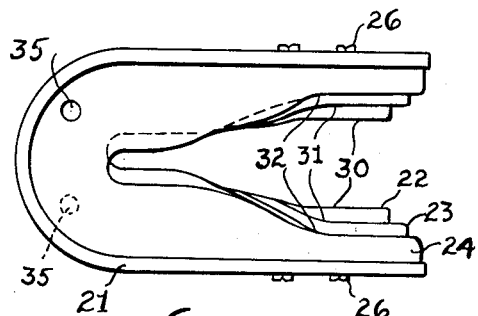
Figure 3 is a bottom plan view of my novel arc chute.
Figure 4:
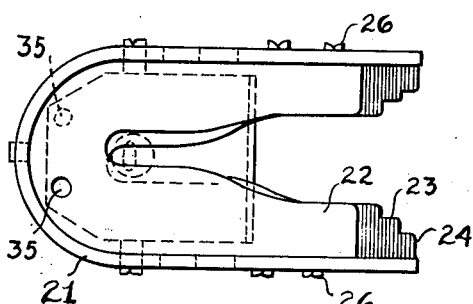
Figure 4 is a top plan view of my novel arc chute.
Figure 5:
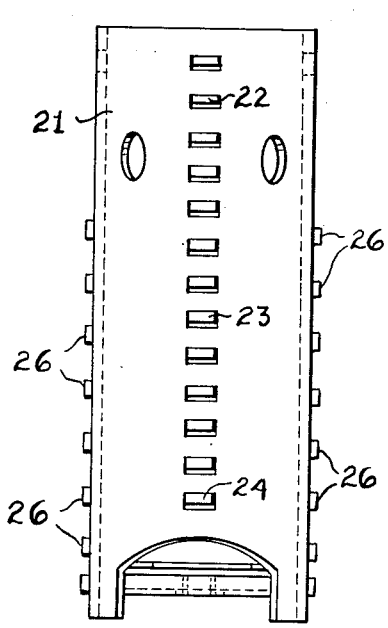
Figure 5 is a front view of my novel arc chute.
Figure 6:
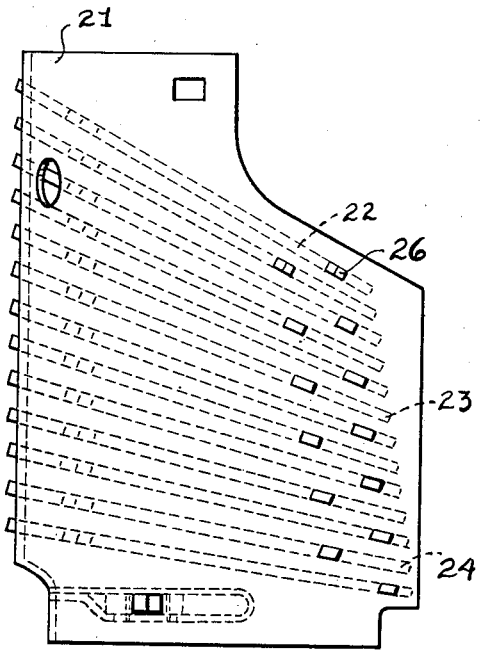
Figure 6 is a side view of my novel arc chute.

Referring first to Figure 1, I have here shown a standard commercial type of small three-pole circuit breaker having an insulating housing 10 and appropriate recesses and supports for the various circuit breaker elements.

Current passes from terminal 11 through the calibrated trip unit 12 to the movable contact 13, then to the stationary contact 14; and then through the terminal strip 15 to the opposite terminal.

Handle 16 operates the contacts 13 to open and closed position. The latch member 17 engaged by the tripping device permits the handle 16 to move contacts 13 to the closed position. When the latch member 17 is released by operation of the tripping device 12, then contact 13 moves to the open position drawing an arc between the stationary and movable contacts.

The arc chute 20 is a development of the arc chute shown in Patent No. 2,244,061. It consists of a fibre insulating wall 21 supporting a plurality of spaced plates 22, 23, 24. The plates are provided with appropriate extensions 26 which pass through appropriate openings in the insulating wall 21 and which are twisted after passing through the openings in order to secure the plates in position.

The plates are thus arranged and stacked in substantially the manner shown in Patent No. 2,244,061 with the notches 30, 31, 32 in the plates arranged slightly off center from a central axis line so that when the plates are reversed with respect to each other a slightly sinusoidal path is provided for the arc in the arc chute.

The plates are also provided with openings 35, the openings being on opposite sides of the central axis in adjacent plates to provide for release of gas pressure between the plates.

The essential element of the invention is that the notches 32 in plates 24 most closely adjacent to the stationary contact and hence most closely adjacent to the point of initiation of the arc are wider than the notches 30 in plates 22 furthest from the point of initiation of the arc.

The width of the notches may be progressively made smaller from the plates closest to the stationary contact to the plate furthest therefrom.

For manufacuring purposes, however, it has been found more practical to make the plates in two or three sets with different sizes of notches. Thus, the set of plates 24 closest to the arc have the widest notches 32. The set of plates 23 at an intermediate position have intermediate width notches 31. The set of plates 22 furthest from the stationary contact have the narrowest notches 30.

In smaller arc chutes two sets of plates may be used with the wide notches closer to the stationary contact and the narrow notches further therefrom. In the arc chute shown, three sets of plates are used. In larger arc chutes, four sets of plates may be used.

Where extreme care is to be exercised in extremely special cases in the construction of the arc chute, then each plate may have a smaller notch as it is positioned progressively further away from the stationary contact.

By this means pitting and erosion of the plates adjacent the stationary contact is obviated and the injection into the arc stream of particles of highly conductive matter is prevented.

Observation of commercial models which had repeatedly been subjected to commercial tests showed that part of the metal arc chute in the region of the initial arc area had disintegrated. It was then found that the circuit breakers gave more consistent results after the notches of the prior plates had burned away.

The burned metal spattered over the interior of the arc chute was undesirable. By making the notches in the plates progressively larger as they approached the stationary contacts or initial arc area, I thereby eliminate the spattering of the molten metal on the interior of the arc chute when the circuit breaker is subject to short circuit interrupting currents.

I have further found that if the sharp corners 40 of the inner edges of the plates are removed by rounding the inner edge as indicated by the shade lines in Figure 7, improved arc interruption is achieved.

In the foregoing I have described my invention solely in connection with specific illustrative embodiments thereof. Since many variations and modifications of my invention will now be obvious to those skilled in the art, I prefer to be bound not by the specific disclosures herein contained, but only by the appended claims.

I claim:

1. In an arc chute for a circuit breaker having a fixed and movable contact, a plurality of arc plates, each plate having a notch, the width of the notch of the plate closest to the fixed contact being greater than the width of any of the notches further removed from the fixed contact, and the width of the notch of each successive plate being progressively smaller from the plates closest to the stationary contact to the plate furthest therefrom, the inner edge of the plates being rounded to eliminate sharp edges on said plates.

2. In an arc chute for a circuit breaker having a fixed and movable contact, a plurality of metal arc plates, each plate having a notch, the width of the notch of the plate closest to the fixed contact being greater than the width of any of the notches further removed from the fixed contact to decrease the erosion of the metal arc chute in the region of the initial arc area, the inner edge of the notch in said plates being rounded to eliminate sharp edges on said plates.

3. In an arc chute for a circuit breaker having a fixed and movable contact, a plurality of arc plates, each plate having a notch, the width of the notch of the plate closest to the fixed contact being greater than the width of any of the notches further removed from the fixed contact, and the width of the notch of each successive plate being progressively smaller from the plates closest to the stationary contact to the plate furthest therefrom.

4. In an arc chute for a circuit breaker having a pair of cooperable contacts, a plurality of metal arc plates, each plate having a notch, the width of the notch of the plate closest to the origin of the arc formed on contact interruption being greater than the width of any of the notches further removed from the origin of the arc to decrease the erosion of the metal arc chute in the region of the initial arc area, the inner edge of the notch in said plates being rounded to eliminate sharp edges on said plates.

5. In an arc chute for a circuit breaker having a pair of cooperable contacts, a plurality of metal arc plates, each plate having a notch, the width of the notch of the plate closest to the origin of the arc formed on contact interruption being greater than the width of the notch of any plate further removed from the origin of the arc, each plate having a notch not greater than the notch of its adjacent plate closer to the origin of the arc.

6. In an arc chute for a circuit breaker having a fixed and a movable contact, a plurality of arc plates, each plate having a notch; the width of the notch of the plate closest to said fixed contact being greater than the width of any of the notches further removed from said fixed contact; one of said plates intermediate said plate closest to said fixed contact and the plate furthest removed from said fixed contact having a width of notch smaller than the width of the notch of said plate closest to said fixed contact and greater than the width of the notch of said plate furthest removed from said fixed contact.

W. HAROLD EDMUNDS.

References Cited in the file of this patent

UNITED STATES PATENTS

| Number | Name | Date |
|---|---|---|
| 1,963,643 | Brainard et al. | June 19, 1934 |
| 2,147,419 | Baker | Feb. 14, 1939 |
| 2,243,038 | Ludwig | May 20, 1941 |
| 2,293,487 | Bartlett | Aug. 18, 1942 |
| 2,353,729 | Jensen | July 18, 1944 |
| 2,451,669 | Eichenberger | Oct. 19, 1948 |